United States Patent Office 3,357,477
Patented Dec. 12, 1967

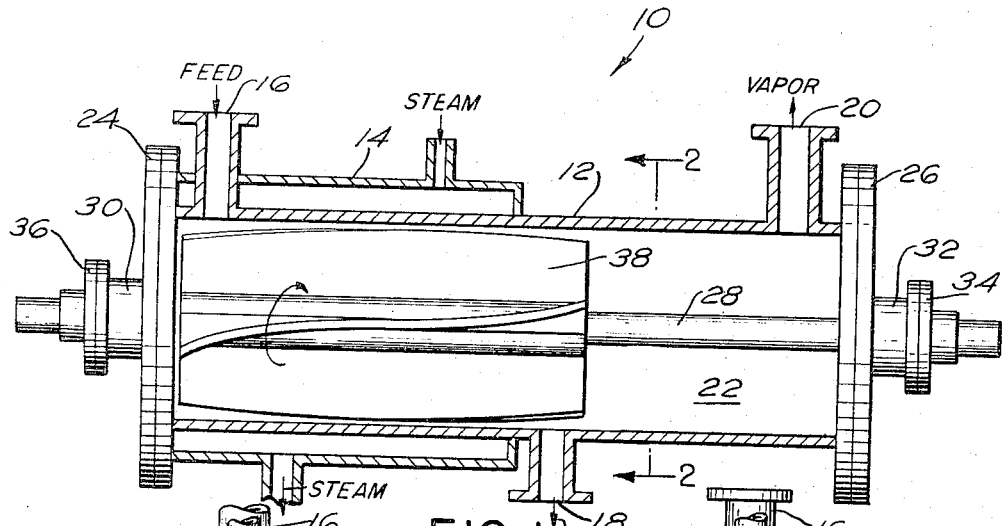
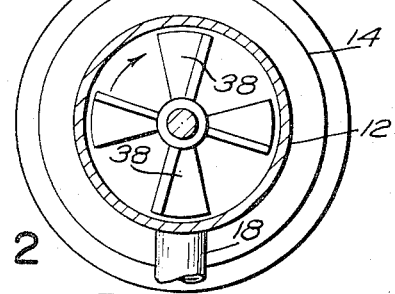
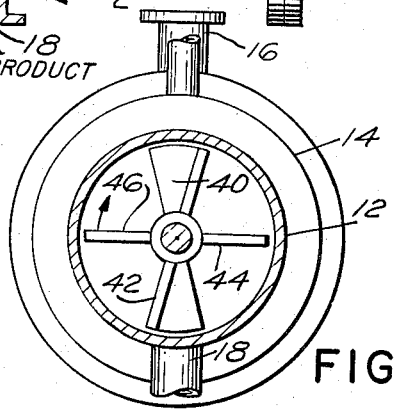
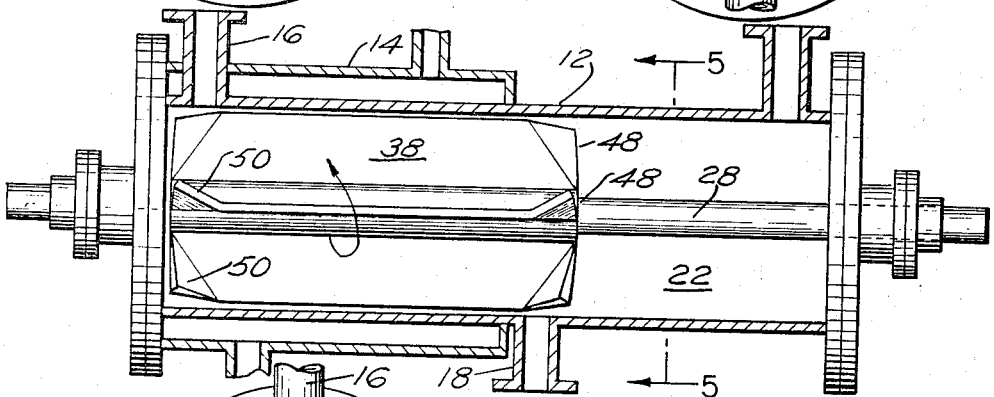
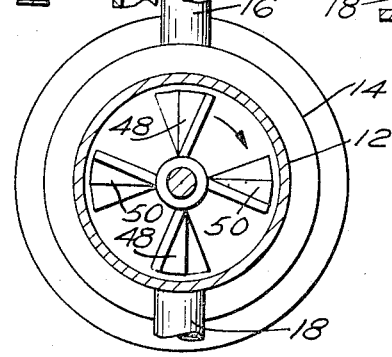

3,357,477
THIN FILM PROCESSING APPARATUS
Leo J. Monty, Reading, Mass., assignor to Artisan Industries, Inc., Waltham, Mass., a corporation of Massachusetts
Filed Dec. 23, 1966, Ser. No. 604,447
10 Claims. (Cl. 159—6)

ABSTRACT OF THE DISCLOSURE

A rotary, horizontal, thin-film type liquid evaporator with helical rotor blades to control the flow path and residence time of a material being processed through the evaporator. The rotor blades may be twisted their entire length or a portion thereof. The helical rotor blades may also prevent or inhibit liquid material from entering the vapor chamber and remove liquids that have accumulated in the vapor chamber.

Background of the invention

My invention relates to a rotary, thin-film type fluid processing apparatus for the treatment, reaction or processing of fluids such as liquids, suspensions, slurries, emulsions, solutions, melted solids and the like. In particular, my invention concerns a wiped or turbulent, thin-film evaporator or fractionator and a twisted rotor blade means to control the residence time and/or flow of the fluid material processed through the evaporator.

In wiped or turbulent, thin-film apparatus, particularly those horizontal or inclined axised evaporators, it is often desirable to control the flow, flow directions, and/or the residence time in the evaporator of the material to be processed. For example, with materials of low viscosity a longer flow path is often desirable, while for materials of higher viscosity a shorter flow path is typically required to achieve the proper residence time and arrive at the desired end point with a minimum of thermal degradation of the material. In addition, liquid feed material may tend to accumulate in horizontal axised evaporators to the feed side of the inlet port, which subjects such material to a longer heating process. Further, particularly with inclined axised evaporator, the liquid product may tend to accumulate within the vapor chamber at or beyond the product or outlet part of the evaporator. In the past, various means have been suggested to correct one or more of these problems. For example, conical or tapered evaporators having the feed port at the wide end of the evaporator have been disclosed for use in controlling the residence time of the process material. Variation in the residence time is accomplished by the balancing of the centrifugal force of the material in the evaporator, i.e., the tendency of the material to return to the inlet end by virtue of the tapered construction of the evaporator, with a pumping force used to introduce and force the material from the one end to the other end of the evaporator (see U.S. Patent 2,927,634 issued Mar. 8, 1966). In addition, various dams on the evaporator body at the outlet end have been disclosed for use to increase the residence time of the processing material (see U.S. Patent 2,927,634 issued Mar. 8, 1966), or to prevent material from entering the vapor chamber (see U.S. Patent 3,261,391 issued July 19, 1966).

Summary of the invention

I have now developed a new and unique apparatus and method for controlling the residence time of material being processed through a horizontally inclined, thin-film type evaporator. In my invention one or more of the rotor blades may be twisted along its entire length, the one end offset from the other by ½ to 90 degrees per linear foot of blades length. With the leading edge of the twisted blade moving in the direction of rotation the residence time of the material being processed is increased because the helical rotor blades create a directional force on the material which force is opposite the flow direction of the material being processed through the evaporator. The direction of rotation may be reversed in a particular operation to decrease the residence time by imparting a directional force to the material which force complements direction of flow of material through the evaporator. Also one or more rotor blades may be twisted a predetermined portion of its entire length to achieve certain desired results. For example a slight twist in the rotor blade adjacent the product end will prevent or inhibit liquid material from passing into the vapor chamber in addition to controlling residence time of material being processed through the evaporator.

Therefore an object of my invention is to provide an improved thin-film apparatus such as an evaporator having rotor blades characterized by a particular helical or twisted configuration to control the flow and/or residence time of the material processed through the evaporator.

Another object of my invention is to provide a rotary, thin-film type evaporator of a horizontal or substantially horizontally inclined type having rotor blades with particular end portions of the blades helical in nature to prevent the accumulation of a feed material at or near the feed end of the evaporator.

Another object of my invention is to provide a rotary, thin-film type evaporator of a horizontal or substantially horizontally inclined type having rotor blades characterized by a slight helical twist at the end adjacent to or near the product outlet to act as a dam means and to prevent or inhibit material from entering the vapor chamber.

A further object of my invention is to provide an improved rotary, thin-film type evaporator characterized by helical blades secured to the rotor shaft to aid or inhibit the flow of liquid material from the feed inlet to the product outlet of the evaporator.

These and other objects of my invention will be apparent to those persons skilled in the art from the accompanying drawing and the following description of my invention wherein:

FIG. 1 is a schematic, longitudinal section through a cylindrical, rotary, wiped, thin-film type evaporator of my present invention having helical rotor blades;

FIG. 2 is a sectional end view taken along the lines 2—2 of FIG. 1;

FIG. 3 is a sectional end view of a modified evaporator of FIG. 1 wherein only some of the rotor blades are helical;

FIG. 4 is a schematic, longitudinal section through a cylindrical, rotary, wiped, thin-film type evaporator of my invention where only the end portion of the rotor blades are twisted; and FIG. 5 is a sectional end view taken along the lines 5—5 of FIG. 4.

Briefly, my invention comprises in combination a closed chamber having an interior wall, a rotor within the chamber, means to rotate the rotor, generally radially and axially arranged rotor blades on the rotor extending from the rotor axis into a close, thin-film association with the interior wall of the chamber, which blades are of a particular helical type configuration to control the flow of material, a feed inlet and a product outlet.

The rotor blades in my helical arrangement are tapered and extend axially, but are not longitudinally aligned with the rotor axis and are characterized by the one end being angularly ahead or behind the other end by a predetermined amount. Such rotor blades will be twisted or tapered a predetermined amount so that the one end would be offset, for example from about ½° to 90° per linear foot of blade length from the other end. In this arrangement the blade being helical or twisted creates additional vector components or directional forces, which are not present when conventional, straight flat rotor blades are used. I have found that a helical blade can be used to increase or decrease the residence time of the material processed in the evaporator, as well as to control the flow of the material. For example, if the leading edge about or adjacent the product outlet is twisted ahead of the trailing edge, i.e., the leading edge twisted toward the direction in which the blade rotates, then as the material flows through the evaporator the residence time is increased, since the flow of the material as thin-film on the wall through the evaporator is counteracted by vector components created by the nature of my blades. As the material forms a thin-film, the material contacts the leading edge or sloped surface of the moving, twisted blade and a vector component is created which throws back or retards the flow of the material being processed through the evaporator, thus increasing the residence time of the material. If the leading edge of the blade is twisted away from the direction in which the blade is rotating, then when the material falls on or comes in contact with the trailing edge or sloped surface of the twisted blade, a vector component is created which complements the direction of flow of material being processed through the evaporator and the residence time is reduced.

In my invention the degree of offset or the extent of the helical twist of the blades used is critical, where control of the residence time is a prime objective. The rotor blades may be twisted or bent along the entire length of the rotor blade, but the degree of offset should not be so great that the vector forces developed are unduly large and make it difficult to process material through the evaporator with the residence time too long causing thermal degradation of the material. For example, I have found that offsets of ½ to 30° per linear foot of blade length are typically sufficient for many operations, while rotor blades with helical turns of 180° or more are unsatisfactory for control purposes. When the degree of offset per linear foot of blade length is unduly large for example, over 180°, the blade then acts as a helical screw and the back force created is so great that it becomes extremely difficult to process material through the evaporator. Another disadvantage with a great degree of offset, is that the turbulent flow between the radial edges of the rotor blades and the interior wall of the chamber tends to cancel out. The degree of offset of my blades is not as critical where the end portion such as the tips of the blades are twisted to prevent material from entering the vapor chamber, to return material accumulated in the vapor chamber to the processing section, to prevent accumulation of material at the feed end, or to divert material toward the product outlet, since large vector components may be needed or desired in these applications, but this applies only to particular portions of the rotor blade.

In its preferred embodiment my invention will be described in connection with a horizontally axised, rotary, wiped, thin-film evaporator, and wherein the vapor is generated during the processing operation following the same direction as the product, i.e., concurrent with respect to the feed material, although my invention may also be employed in those evaporators wherein the flow of the vapor to the liquid feed is countercurrent, i.e., the vapor chamber is adjacent to the feed end. One embodiment of the present invention is shown in FIG. 1 wherein a horizontally axised evaporator 10 comprises a closed, cylindrical chamber 12 having interior walls and surrounded to a greater part of its length by a temperature control jacket 14 adapted for the introduction of a heating or cooling heat exchange fluid such as steam, cold water or the like. The chamber 12 is characterized by a feed inlet 16, a product outlet 18 at the opposite end thereof, and a vapor outlet 20, which vapor outlet extends from a vapor chamber 22 adjacent the product end of the evaporator. Closing heads 24 and 26 are secured to either end of the chamber 12, and support a horizontal, central-axised, tube-like rotor 28, which extends from one end to the other end of the chamber 12 and through the vapor chamber 22. The rotor 28 is driven by a motor or other means (not shown), and generally extends outwardly from each end of the closing heads. The rotor 28 extends through suitable bearings 30 and 32 and seals on packing 34 and 36 are disposed at either end of the evaporator. The rotor shaft 28 is mounted for axial displacement or adjustment by any desired or convenient means which may include a series of grooves or threads which locate the rotor shaft with respect to the end plates 24 and 26.

Extending axially outwardly from the rotor shaft 28 are a plurality of radial rotor blades 38, which are smoothly twisted or bent and extend axially from the one to the other end of the chamber, but are not longitudinally aligned with the rotor axis on a plane, and are characterized by the one end being ahead or behind the other end a predetermined amount. The radial edges of the helical or twisted blades extend into a small, but generally uniform, closely-spaced relationship with respect to the interior wall of the chamber 12, so that upon rotation of the rotor shaft 28 the rotor blades 38 provide a thin, wiped or turbulent film of the material on the interior walls of the chamber 12. The residence time of the material being processed will vary with the viscosity of the material and the degree, the leading edge is twisted ahead of the trailing edge.

In operation referring to FIGS. 1 and 2, a liquid such as a low viscosity liquid to be processed through the evaporator 10 is introduced into the feed port 16 by pump, gravity or under vacuum with the relatively nonvolatile product material withdrawn through product outlet 18, and the vaporized material withdrawn through vapor outlet 20. Of course, if desired, other vapor product outlets and feed inlets may be used. The rotor shaft 28 and the rotor blades 38 are rotated at high speed during the processing to form a thin-film of the feed material against the interior wall of the chamber 12 with a heat exchange fluid such as steam introduced into the temperature control jacket 14, whereby the thin-film on the interior wall is placed in heat exchange relationship with the steam in the heating jacket to affect an evaporation of the relatively volatile component of the feed material as the material proceeds through the evaporator.

As the rotor blades rotate (clockwise overrunning or as viewed from the vapor chamber as shown in FIG. 1), the leading edge of the helical blade 38 exerts a directional force on the material which is opposed to the movement of the product material flowing through the evaporator 10. The degree that the leading edge is twisted ahead of the trailing edge will control the residence time of the material being processed through the evaporator 10. A ½° lead per linear foot of blade length will not increase the residence time nearly as much as a 45° lead per linear foot of blade length. The blades twisted in this manner retard the flow of the material since as the material is cast on the sloping or leading edge of the helical blade 38 the directional force propels the material backwards, thus, retarding the flow of material and increasing the residence time. As shown, the blade 38 extends slightly beyond the product outlet 18. In this area adjacent the product outlet 18, the helical blade serves three functions. The first is to retard the entire flow of the material being processed through the evaporator 10; secondly, to function as a directional dam to reduce the amount of liquid that would flow into the vapor chamber 22, and thirdly, the rotor blade 38 functions as a vane type pump and tends to pick up liquid material accumulated in the vapor chamber 22, and return it toward the product outlet 18. In the embodiment described above, if the rotation of the helical blades 38 is reversed during operation then, when the material being processed is cast on what would now be the forward sloping or trailing edge of the helical blade 38, a directional force is created which complements the direction of flow of the material away from the feed inlet 16 through the evaporator, and the residence time is reduced. In addition, the blade functioning in this manner prevents feed material from accumulating on the interior wall of the chamber 12 to the left of the feed port 16.

FIG. 3 illustrates a modification of my invention where only two rotor blades 40 and 42 are twisted and rotor blades 44 and 46 are of the straight conventional type. FIG. 3 is similar to FIG. 2 taken along the same lines and viewed from the vapor chamber. The helical blades 40 and 42 are diametrically opposite one another to prevent vibration. In FIG. 3 the helical blades 40 and 42 serve to control the residence time of the material being processed through the evaporator in manner as described above when four helical blades are used.

Another embodiment of my invention shown in FIGS. 4 and 5 is to have only a particular portion of the rotor blades twisted or bent. In this embodiment the blade 38 would be twisted a predetermined portion of the entire length of the blade. This may be done at both ends of the blade with the leading edge 48 of the blades adjacent the product outlet twisted in the direction of rotation of the rotor shaft. Thus, the material falling on the leading edge or sloped surface 48 would have a directional force opposite the flow of material being processed through the evaporator, increasing the residence time, and acting as a directional dam to prevent the process material from entering the vapor chamber. The leading edge or sloped surface 48 extends beyond to product outlet 18 and acts as a van type pump by picking up and returning to the processing section liquid material accumulated in the vapor chamber 22. The end 50 of the blade adjacent the feed inlet could be twisted away from or opposite the direction in which the rotor shaft would be rotating. When the material falls on the trailing edge or sloped surface 50 of the blade, it would have a directional force complementing the flow of material being processed through the evaporator and act as a directional dam to prevent material from accumulating on the closing head 26. In this arrangement if greater residence time is desired the section of the blade adjacent the product outlet would be twisted for a greater length along the blade, and to a greater degree than the twisted portion at the opposite end thereof. If reduced residence time is desired then the section of the blade at the feed end would be twisted for a greater length along the blade and to a greater degree than the twisted portion at the opposite end thereof.

Of course, it is understood that my invention may be used to provide any of several combinations of twisted and straight portions along an individual blade length. For example, the blade may be twisted in the direction of rotation for a short distance at the feed inlet to retard the flow of materials and increase the residence time, the next portion of the blade would be straight to allow the material to proceed toward the product outlet as it increases in viscosity, the next portion would be twisted away from the direction of rotation to create vector forces to aid in moving the viscous material toward the product outlet, and the last portion of the blade beyond the product outlet would be twisted in the direction of rotation to prevent or inhibit the viscous material from flowing into the vapor chamber.

In mechanically aided film type evaporators, the rotor blade tips typically do not touch the interior wall of the chamber and, thus, create a turbulent film of material. However, if the material being processed or during processing becomes very viscous, the thin-film on the interior wall is not agitated or made turbulent by the rotating blade tips. In such cases the capacity to put heat into the material is reduced so that recovery from this condition is attempted by increasing the rotor speed to increase centrifugal force which results in more plowing action and agitation of the thin-film. For the purpose of this application the term "thin-film" is meant to include both cases wherein a wiped or turbulent thin-film is created by rotating rotor blades.

My invention has been described in particular in connection with the cylindrical type, horizontal axised evaporator. However, my means to control the residence time of the material in such apparatus may be profitably employed in tapered or conical-shaped, thin-film evaporators where such means may be used in conjunction with or in addition to the tapering of the internal chamber walls to retard or enhance the axial flow of material from the inlet to the outlet and through the evaporator.

What I claim is:

1. An improved fluid processing apparatus of a thin film type which comprises in combination:
   (a) a closed chamber characterized by an interior wall defining a surface of revolution;
   (b) a rotor shaft within the chamber;
   (c) means to rotate the rotor shaft;
   (d) an inlet for the introduction of feed material;
   (e) an outlet axially spaced apart from the inlet for the removal of product material;
   (f) rotor blades secured to the rotor shaft for rotation therewith, the blades having a one end and other end and radially and coaxially arranged from the rotor shaft and extending into a close thin-film forming relationship with the interior wall, said blades having a helical twist therein at either one or the other end thereof, the remaining portion of the blades being coplanar with the rotor shaft axis.

2. The apparatus of claim 1 wherein the discharge end of the blade extends downstream of the product outlet and said end is twisted in the direction of rotation acting to provide a vector component directing material back toward the product outlet.

3. The apparatus of claim 1 wherein the feed inlet end of the blade is twisted in the direction of rotation to provide a vector component directing material away from the feed inlet.

4. The apparatus of claim 1 which includes means to axially adjust the rotor shaft.

5. The apparatus of claim 1 which includes means to reverse the direction of rotation of the rotor shaft.

6. The apparatus of claim 1 which includes a vapor chamber in the one or the other end of the closed chamber which vapor chamber includes a vapor outlet and wherein the helical twisted portion of the rotor blades extends into said vapor chamber, these portions of the blades being twisted such that upon rotation of the rotor the liquid accumulated in the vapor chamber and contacted with the blade ends during operation is provided with a vector component backwards towards the product outlet.

7. An improved fluid processing apparatus of the thin film type which comprises in combination:
   (a) a closed chamber characterized by an interior wall defining a surface of revolution;
   (b) a rotor shaft within the chamber;
   (c) means to rotate the rotor shaft;
   (d) an inlet for the introduction of feed material;
   (e) an outlet axially spaced apart from the inlet for the removal of product material;
   (f) rotor blades secured to the rotor shaft for rotation therewith, the blades having a one end and other end and radially and coaxially arranged from the rotor shaft and extending into a close thin film forming relationship with the interior wall, said blades characterized at least in part by a helical twist therein along the rotor axis over a portion of its axial length, and further characterized at least in part by a section coplanar with the rotor axis therein over a portion of its axial length, whereby during operation an axial vector component is imparted by the helical twist to the material.

8. An improved fluid processing apparatus of the thin film type which comprises in combination:
 (a) a closed chamber characterized by an interior wall defining a surface of revolution;
 (b) a rotor shaft within the chamber;
 (c) means to rotate the rotor shaft;
 (d) an inlet for the introduction of feed material;
 (e) an outlet axially spaced apart from the inlet for the removal of product material;
 (f) rotor blades secured to the rotor shaft for rotation therewith, the blades having a one end and other end and radially and coaxially arranged from the rotor shaft and extending into a thin film forming relationship with the interior wall, said blades extending from the vicinity of the feed inlet to the vicinity of the product outlet, the peripheral edges of said blades being smooth along their entire length, said blades characterized by a helical twist therein of not more than ½ to 30° from one to the other end of the blades.

9. The apparatus of claim 8 which includes means to axially adjust the rotor shaft.

10. The apparatus of claim 8 which includes means to reverse the direction of rotation of the rotor shaft.

References Cited

UNITED STATES PATENTS

| | | | |
|---|---|---|---|
| 1,284,074 | 11/1918 | DuPont | 159—6 |
| 1,420,648 | 6/1922 | Mabee | 159—6 |
| 1,466,579 | 8/1923 | Collver | 159—6 |
| 2,656,885 | 10/1953 | Hughes | 159—11 |
| 2,927,634 | 3/1960 | Gudheim | 159—6 |
| 3,067,812 | 12/1962 | Latinen et al. | 159—6 |
| 3,211,209 | 10/1965 | Latinen et al. | 159—6 |

FOREIGN PATENTS 1,161,852  1/1964  Germany.

NORMAN YUDKOFF, *Primary Examiner.*

J. SOFER, *Assistant Examiner.*